United States Patent [19]
Philippe et al.

[11] Patent Number: 5,992,337
[45] Date of Patent: Nov. 30, 1999

[54] METHODS OF IMPROVING PRODUCTIVITY OF BLACK LIQUOR RECOVERY BOILERS

[75] Inventors: Louis C. Philippe, Versailles; Eric L. Duchateau, Gieres, both of France; David R. Scheeff, Marietta, Ga.; Arie Verloop, Kirkland; Edward C. Dye, Bothell, both of Wash.

[73] Assignees: Air Liquide America Corporation, Houston, Tex.; American Air Liquide, Inc., Walnut Creek, Calif.; l'Air Liquide, Societe Anonyme Pour l'Etude et, l'Exploitation des Procedes Georges Claude, Paris, France; Jansen Combustion and Boiler Technologies, Inc., Woodinville, Wash.

[21] Appl. No.: 08/937,290
[22] Filed: Sep. 26, 1997
[51] Int. Cl.⁶ .................. F23L 9/02; D21C 11/12
[52] U.S. Cl. ............... 110/348; 110/345; 110/214; 110/238; 162/31; 422/185
[58] Field of Search ................. 110/238, 210, 110/213, 214, 260, 297, 343, 345, 346, 348, 233, 234, 182.5; 431/10; 162/1, 29, 30.1, 30.11, 31; 422/129, 185

[56] References Cited

U.S. PATENT DOCUMENTS

| | | |
|---|---|---|
| 4,515,095 | 5/1985 | Greskovich . |
| 4,823,710 | 4/1989 | Garrido et al. . |
| 4,857,282 | 8/1989 | Mullen . |
| 4,940,004 | 7/1990 | Jansen . |
| 5,107,777 | 4/1992 | Mullen . |
| 5,242,296 | 9/1993 | Tuson et al. ................ 431/10 |
| 5,419,812 | 5/1995 | Beal . |
| 5,601,425 | 2/1997 | Kobayashi et al. ............ 431/10 X |

FOREIGN PATENT DOCUMENTS

| | | |
|---|---|---|
| 0 641 884 A1 | 5/1994 | European Pat. Off. . |
| 0761871A1 | 3/1997 | European Pat. Off. . |
| WO 92/21815 | 12/1992 | WIPO . |
| WO 94/12829 | 6/1994 | WIPO . |
| WO 95/25845 | 9/1995 | WIPO . |

OTHER PUBLICATIONS

Communication from EPO dated Dec. 28, 1998—European Search Report.
Grace, T.M., pp. 52–57, "Increasing Recovery Boiler Throughput," TAPPI Journal, Nov. 1984.

*Primary Examiner*—Ira S. Lazarus
*Assistant Examiner*—Ljiljana V. Ciric
*Attorney, Agent, or Firm*—Jeffrey L. Wendt

[57] ABSTRACT

Methods of increasing the throughput of recovery boilers equipped with at least two levels of injection of air, the methods improving the thermal efficiency of the boiler with oxygen enrichment of the air in at least one level of the combustion air system, at or above the secondary air level. In one method, a black liquor recover boiler having two levels of air injection is retrofitted with a third level of oxidant injection below or at the same level as the original secondary air, and oxygen enrichment is applied to at least the original secondary air stream and the third level air stream. A preferred method is for the third level to be placed at or close to the same level as the black liquor injector ports.

8 Claims, 3 Drawing Sheets

METHODS OF IMPROVING PRODUCTIVITY OF BLACK LIQUOR RECOVERY BOILERS

FIELD OF THE INVENTION

The present invention relates to the field of combustion of kraft black liquor and chemical recovery in kraft recovery boilers.

RELATED ART

The kraft black liquor recovery boiler is a critical component in the production of paper pulp. Two functions are associated with the recovery boiler: the combustion of the organic materials contained in the black liquor for the production of heat and steam, and the conversion of the inorganic chemicals of the black liquor into a smelt which consists mainly of sodium carbonate ($Na_2CO_3$), sodium sulfide ($Na_2S$), and a small amount of sodium sulfate ($Na_2SO_4$). In further steps of the pulping process, the smelt is converted into cooking liquor, the chemical used to transform wood chips into pulp. This transformation in turn produces black liquor that must be disposed of and recycled in the recovery boiler. One of the most important functions of the recovery boiler is to convert the sodium and sulfur content of the black liquor into sodium sulfide. The efficiency of this conversion is expressed as the reduction efficiency, defined as the ratio of sodium sulfide ($Na_2S$) in the smelt to the total of sodium sulfide and sodium sulfate ($Na_2SO_4$) in the smelt. Operation with the highest reduction efficiency is desirable.

Because recovery of the chemicals contained in the black liquor is so important in the pulping process, the recovery boiler is often the bottleneck in increasing the pulping capacity of a mill. Insufficient capacity to burn and recover chemicals from black liquor yields a deficiency in cooking liquor, that can force mills to slow down production, and/or ship black liquor to other mills that have excess recovery capacity, and/or to buy make up chemicals to compensate for the lack of cooking liquor. All of these activities are detrimental to the cost of the pulp produced in the mill.

Adding additional recovery boiler capacity can be obtained by installing a new recovery boiler, or another means of burning black liquor, such as a gasifier, or a fluidized bed. These solutions are avoided when possible, because they are associated with high capital costs, and represent an additional unit to operate and maintain. Preferred solutions are solutions that retrofit an existing recovery boiler and add black liquor combustion capacity without excessive capital costs or time required to install.

In recovery boilers, black liquor combustion occurs by in-flight burning, and char bed burning. During in-flight burning, the water from the black liquor droplets is evaporated in what is commonly referred to as a "drying stage," organic materials are volatilized and burned in what is commonly referred to as a "volatilization stage," and the solid residue known as char burns in what is commonly known as a "char burning stage." The unburned residue falls onto the char bed located at the bottom of the furnace, where combustion and chemical recovery are completed. To sustain combustion, air is injected at various heights in the furnace: primary air is the lowest level of air injection, situated at the lower level of the char bed; some boilers have a secondary air level which is positioned above the top of the char bed. Both the primary and the secondary air levels are located below the level of the liquor guns used to spray coarsely atomized black liquor into the furnace. Modern recovery boilers have a third level of air injection which is located above the level of the liquor guns (tertiary air). Some very large boilers have a fourth air injection level (quaternary air) above the liquor gun elevation.

One important limitation to the increase of throughput of a recovery boiler is fouling of the convection heating surfaces. When attempting to increase the black liquor feed rate, the quantity of combustion air required must be increased, which results in an increased volume of combustion products, increased vertical gas velocity, and additional entrainment of liquor, char, and/or smelt particles (carryover) would occur. This problem is worsened when the combustion chamber height is relatively small. Fouling of the upper sections of the boiler by the carryover material can result in the plugging of the flue gas passages, and will eventually cause a boiler shut down. Boiler shut downs and start-ups are complicated operations that should be avoided as much as possible. In addition, during boiler shut down, a temporary solution for black liquor disposal and cooking chemical make up must be found, which is often a cost penalty.

Another difficulty of increasing boiler throughput is the need to supply additional combustion air and handle more flue gas. Fan capacity limitations can be found, either on the combustion air supply side, the exhaust side, or both, that will prevent combustion of additional black liquor in an existing furnace.

Solutions to the previous limitations can be found by minimizing the excess air (excess air is the volume of air over and above the volume of air needed to complete combustion) for combustion. However, lowering the excess air may result in increased pollutant emissions, such as carbon monoxide (CO) and sulfur compounds (TRS). In older boilers with two levels of air, where the tangential injection of combustion air does not provide good penetration of the air into the center of the furnace, adding a third level is a convenient solution to reduce the excess combustion air because three level air injection gives a more efficient distribution and mixing of the air in the different areas of the boiler. Two level air furnaces that are overloaded have also shown not to be as efficient at completely oxidizing CO and sulfur compounds and thus yield higher pollutant emissions. For this reason, and the obligation of operating with a large excess air to compensate for the poor mixing of the combustion air with the combustibles, the boilers with two levels of air are progressively retrofitted by more efficient three level air systems. On three level air systems, retrofitting the boiler with high velocity air nozzles such as described in U.S. Pat. No. 4,940,004 in the secondary and tertiary levels of the furnace can improve mixing and allow operation with even less excess air.

Reducing the excess air has also a positive effect on the thermal efficiency of the boiler, defined as the ratio of energy in the steam produced in the boiler over the amount of energy in the black liquor.

Oxygen injection has been proposed to further reduce the air and the flue gas volumes in recovery boilers. In a boiler operated with an oxidant which oxygen concentration exceeds that of the air, more black liquor can be burned with a constant volume of air and flue gas. For example, in a review article entitled "Increasing Recovery Boiler Throughput" by T. M. Grace, published in the November 1984 issue of Tappi Journal, given as a reference, the author cites oxygen enrichment as a means of reducing the volume of air and flue gas for a given heat release. In U.S. Pat. No. 4,823,710, an oxygen injection method is described where combustion is improved by introducing an oxygen containing gas, preferably with an oxygen concentration higher than air, from at least one location remote from the boiler sidewalls. U.S. Pat. No. 4,857,282 discloses a method to use oxygen enrichment in the primary and secondary air system of the boiler. However, the '282 patent does not disclose or suggest oxygen enriched air injection at the secondary or tertiary air levels without injection at the primary air level.

SUMMARY OF THE INVENTION

In accordance with the present invention, methods are presented to increase the throughput of recovery boilers equipped with at least two levels of injection of air without increasing the carryover of inorganic materials in the recovery boiler in order to prevent plugging of the convective sections of the boiler. Another advantage of the methods of the invention is lowering the emissions of gaseous pollutants from the recovery boiler. Another advantage of the methods of the invention is to improve the furnace control and stability of operation, and to eliminate or reduce the need for an auxiliary fuel to sustain the combustion of low heat content black liquors, and the chemical reduction efficiency in the furnace is increased.

One aspect of the invention is a method to increase the throughput of a recovery boiler equipped with at least two levels of injection of air, the method comprising improving the thermal efficiency of the boiler with oxygen enrichment of the air in at least one level of the combustion air system, at or above the secondary air level.

A second aspect of the invention is a method to retrofit black liquor recovery boilers having a two level air injection system with a third level of oxidant injection below or at the same level as the original secondary air, and oxygen enrichment applied to at least the original secondary air stream and the third level. A preferred method is for the third level to be placed at the same level as black liquor injector ports. Another preferred method comprises injecting the third level of oxygen enrich air at the same level as the secondary air injection ports. A more preferred embodiment of this method is to place the third level at a level lower than the level of the black liquor injection guns and higher than the primary air level. Once retrofitted to three levels of air injection, the two upper levels of air injection are re-named: the third level becomes the secondary level, and the original secondary level becomes the tertiary level.

In a third method of the invention applicable to boilers with at least three air injection levels, or boilers with two air injection levels retrofitted to three levels as described above for the third aspect of the invention, oxygen enrichment is applied to at least the secondary and the tertiary air levels. In preferred methods of the invention, oxygen enrichment is applied to the primary air level in addition to the secondary and tertiary air levels.

In a fourth method of the invention applicable to boilers with at least four air injection levels, oxygen enrichment is applied to at least the secondary and one or more of the two upper air levels. In preferred methods of the invention, oxygen enrichment is applied to the primary air level in addition to the secondary and fourth air levels.

In preferred aspects of the invention, oxygen enriched air is injected at a velocity greater than 100 feet per second (ft/s) where oxygen enrichment is applied. More preferably, the oxygen enriched air stream is injected at a velocity greater that 200 ft/s in the secondary oxidant stream, and at a velocity greater than 200 ft/s in the tertiary oxidant stream.

In preferred aspects of the invention that apply to boilers with four levels of combustion air, oxygen enriched air is injected at a velocity greater than 100 ft/s where oxygen enrichment is applied. More preferably, the oxygen enriched air stream is injected at a velocity greater that 200 ft/s in the secondary oxidant stream, and at a velocity greater than 250 ft/s in the fourth oxidant stream.

A fifth aspect of the invention is a method of controlling the oxygen concentration in the flue gas of a recovery boiler when oxygen enrichment of the combustion air is applied, the method being applicable to boilers with at least three levels of air injection, or a recovery boiler with an original two level air injection system retrofitted to three levels as described above, the method including the steps of:
 a) supplying oxygen flows to at least two combustion air levels of the recovery boiler, the two combustion air levels being different from the primary air level, for oxygen enrichment of the the two combustion air levels;
 b) selecting a desired oxygen concentration in the flue gas called set point concentration,
 c) sensing the oxygen concentration in the flue gas;
 d) adjusting the oxygen flow injected in the tertiary combustion air level, in order to maintain the sensed oxygen concentration in the flue gas at about the set point oxygen concentration, while maintaining the flow of oxygen in the secondary level combustion air constant.

Secondary and tertiary air levels are as defined in the above.

In a sixth aspect of the invention, a method is provided for controlling the oxygen concentration in the flue gas of a recovery boiler when oxygen enrichment of the combustion air is applied, the method being applicable to boilers with at least four levels of air injection. This seventh method comprises the steps of:
 a) supplying oxygen flows to at least two combustion air levels of the recovery boiler, the two combustion air levels being different from the primary air level, for oxygen enrichment of the the two combustion air levels;
 b) selecting a desired oxygen concentration in the combustion products called set point concentration;
 c) sensing the oxygen concentration in the flue gas;
 d) adjusting the oxygen flow injected in the upper most combustion air level, in order to maintain the sensed oxygen concentration in the flue gas at about the set point oxygen concentration, while maintaining the flow of oxygen in the other level of combustion air constant.

A seventh aspect of the present invention is a method to improve the combustion stability or chemical recovery of a recovery boiler where oxygen enrichment is applied to at least one level of the combustion air system at or above the secondary air, comprising the steps of:
 a) supplying oxygen flows to the primary combustion air level of the recovery boiler for oxygen enrichment of the primary air,
 b) sensing either one or all of the following quantities: reduction efficiency of the smelt, sulfur dioxide $SO_2$ concentration in flue gas, or bed temperature;
 c) adjusting the oxygen flow injected in the primary combustion air level, in order to obtain at least one of the following effects on either or all of the following quantities: reduction efficiency above 90% and minimize $SO_2$ emissions.

An eighth aspect of the present invention is a method to improve the combustion stability or chemical recovery of a recovery boiler where oxygen enrichment is applied to at least one level of the combustion air system at or above the secondary air level, the method comprising the steps of:

a) sensing either one or all of the following quantities: the reduction efficiency of the smelt, the sulfur dioxide $SO_2$ concentration in the flue gas, or the bed temperature b) adjusting the oxygen flow injected in the secondary combustion air level, in order to obtain the following effects on either or all of the following quantities: keep the reduction efficiency above 90%, minimize the $SO_2$ emissions.

In the methods of the invention, when oxygen enrichment is applied to two or more levels of combustion air, the oxygen concentration in the oxidant in each level of oxygen enriched air injection can be controlled independently.

A ninth aspect of the invention is a method of controlling temperature profile in a recovery boiler when oxygen enrichment of the combustion air is applied, said method including the steps of:

a) supplying oxygen flows to at least two combustion air levels of the recovery boiler, the two combustion air levels being different from the primary air level, for oxygen enrichment of the the two combustion air levels b) selecting an optimal temperature profile for the boiler based on the prior knowledge of the boiler operation, called set point temperature profile, c) sensing average temperatures at different levels of the boiler with an optical technique, and inferring a temperature profile for the boiler, d) adjusting the oxygen flow injected in the at least two combustion air levels so that the measured temperature profile matches the boiler set point temperature profile.

Preferred optical techniques for the temperature measurement are based on the absorption and/or emission of sodium bearing species, such as, but not limited to: elemental sodium atom Na, sodium sulfate ($Na_2SO_4$), and sodium sulfide ($Na_2S$). Preferred oxygen concentrations enrichment in the at least one level of the combustion air system located at or above the secondary air level are less than 30%. More preferably, the oxygen concentrations in the at least one level of the combustion air system located at or above the secondary air level is comprised between 22% and 26%.

DESCRIPTION OF PREFERRED EMBODIMENTS

In a combustion process where air is used as the oxidant, a fraction of the available heat of combustion is lost in the sensible heat of the flue gas. The flue gas is essentially comprised of nitrogen, water, and carbon dioxide. When the nitrogen concentration of the flue gas is reduced by replacing some of the combustion air by pure oxygen, less energy is lost in the flue gas, and more useful heat becomes available. Another effect of oxygen enrichment is to increase the flame temperature, and increase the heat transfer rate to the water cooled furnace walls: this usually results is a lower flue gas temperature at the boiler exit. The higher oxygen concentration combined with the higher combustion temperature also accelerates the rate of combustion, allowing firing with a lower excess air while maintaining the concentration of unburned species low. In a recovery boiler, a higher temperature in the bottom part of the furnace has a positive effect on the smelt reduction efficiency because more energy is available for the endothermic reaction of converting of sulfate to sulfide.

Application of the Invention to a Three Air Level Recovery Boiler

Figure 1:
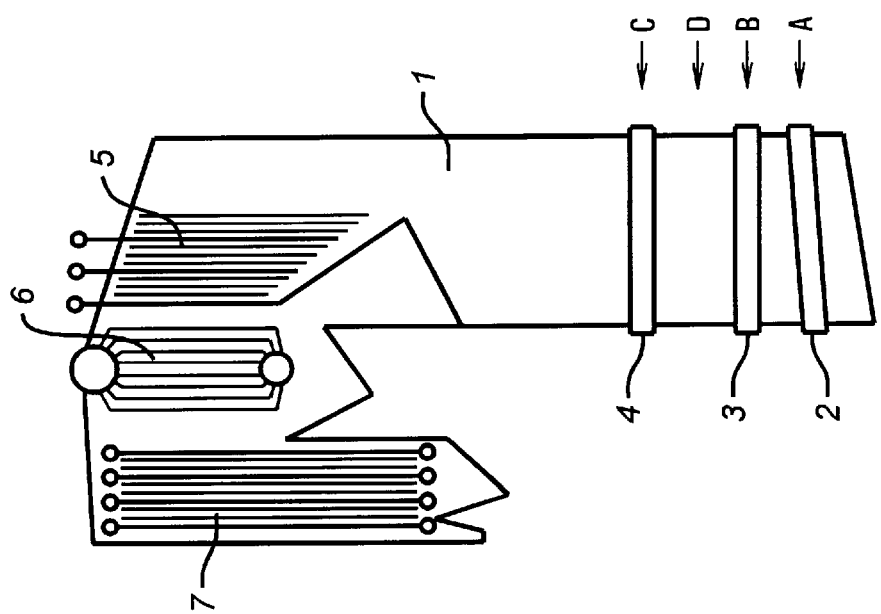
FIG. 1 is a schematic view of a recovery boiler useful in the invention.

To quantify the affect of oxygen enriched air combustion on a recovery boiler operation, the case of a recovery boiler designed for 3.0 million lbs/day of virgin dry solids, operated at 3.3 million lbs/day, equipped with three levels of combustion air injection was considered. Such a boiler is schematically illustrated in FIG. 1. For boiler 1, primary air 2 is introduced at level A, secondary air 3 is introduced at level B, and tertiary air 4 is introduced at level C. Liquor guns for black liquor injection are located at level D. Typically, level B is located 4 to 6 ft. above level A, and level C is located about 10 ft. above level D of the liquor guns. The upper part of boiler 1 has a superheater section 5, a boiler bank 6, and an economizer section 7. The boiler dimensions were 31 ft. in width, 30 ft. in depth, 80.6 ft. in height (from floor to nose). The corresponding furnace cross section was 930 $ft^2$, and the furnace volume was 70,000 $ft^3$. Heat and mass balance calculations were carried out for this recovery boiler, for conditions where boiler 1 was using air as the combustion oxidant (21% oxygen concentration), and at various oxygen enrichment levels in the secondary and tertiary air, with incremental oxygen concentrations in the combustion oxidant, up to 30%. For the calculation, the actual black liquor Higher Heating Value was 6200 Btu/lb.

Figure 2:
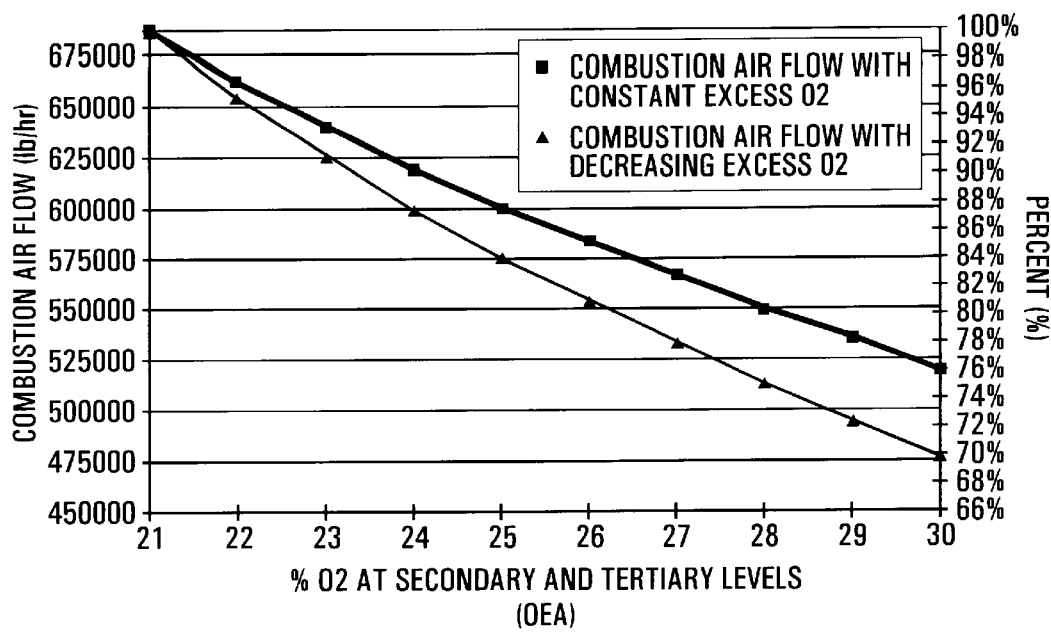
FIG. 2 illustrates the effect of oxygen enrichment on the secondary and tertiary levels on the total combustion air flow required to completely burn the black liquor in a recovery boiler.

FIG. 2 illustrates the effect of oxygen enrichment on the secondary and tertiary levels on the total combustion air flow required to completely burn the black liquor, assuming the black liquor flowrate is kept constant. A 24% reduction in combustion air flow is obtained by going from 21% oxygen in the secondary and tertiary air flows to 30%. When the excess oxygen in the flue gas is reduced, as can be expected from a furnace where oxygen enrichment is used, the air requirement is reduced by 30%.

Figure 3:
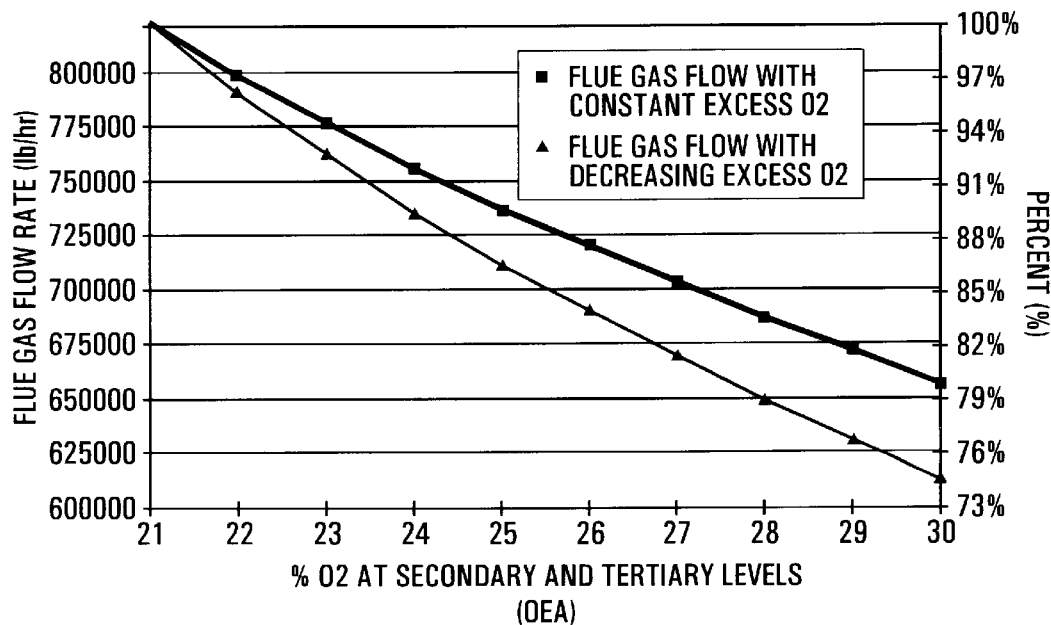
FIG. 3 is a graph illustrating the effect of oxygen enrichment on the flue gas quantity produced when completely burning the black liquor.

Simultaneously, as can be seen from the graph of FIG. 3, the flue gas volume is reduced by 20%, and up to 25% if a reduction in excess oxygen is assumed. This has a positive effect on the carry over and on the pluggage in the upper sections of the furnace (superheater, boiler bank).

Figure 4:
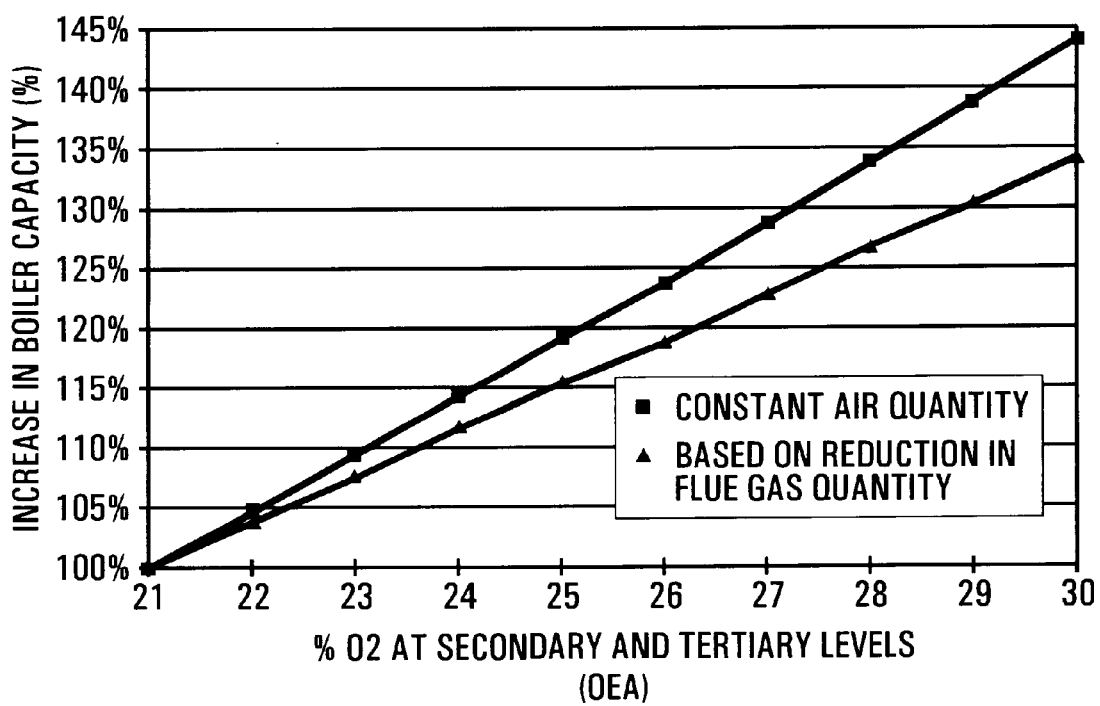
FIG. 4 illustrates that 15% more black liquor can be combusted in the recovery boiler of FIG. 1 for the same amount of flue gas volume that would be produced if the boiler were fired without oxygen enrichment.

The reduced volumes of air and flue gas allow for an increase in boiler black liquor processing capacity: based on an oxygen enrichment level of 25% in the secondary and tertiary air, 15% more black liquor can be processed in the boiler for the same amount of flue gas volume that would be produced if the boiler was fired without oxygen enrichment. This is illustrated in FIG. 4 for various oxygen enrichment levels at the secondary and tertiary levels.

Recovery boilers are usually equipped with means of measurement of the oxygen concentration in the flue gas. In conventional black liquor boilers, changing black liquor compositions or changes in solids content modify the oxidant requirement for the combustion, and air adjustments must be done, often manually. According to a method of the invention, the oxygen flow injected in the tertiary air stream is adjusted automatically to maintain the oxygen concentration in the flue gas at a constant pre-set value. Simultaneously, the oxygen flow injected in the secondary air level is kept constant, as well as all air flows to the furnace. Thus, the oxygen injection at the tertiary level is used to finely adjust the oxygen concentration in the flue gas.

Oxygen enriched air, with an oxygen concentration less than 30% (preferably comprised between 22% and 26%) is injected through oxidant nozzles installed in the secondary and tertiary air levels, at a velocity greater than 100 ft/s, preferably greater than 200 ft/s for the secondary oxidant stream, and greater than 250 ft/s for the tertiary air stream.

Additional injection of oxygen in the primary air can be used to control the reduction efficiency and the $SO_2$ emissions. By adding oxygen at the bed level, in addition to adding oxygen at the secondary and tertiary air levels, additional energy is provided to enhance the endothermic reduction of the sodium sulfate to sodium sulfide, hence the reduction efficiency is improved. As $SO_2$ is trapped by sodium compounds, increasing the bed temperature will increase sodium volatilization, a phenomenon known as fuming, and allow the reduction of $SO_2$ emissions. The oxygen flow injected to the primary air level or the secondary air level can be directly tied to a measurement of the bed temperature, the reduction efficiency, or the $SO_2$ flue gas concentration.

Application of the Invention to a Two Air Level Recovery Boiler

Figure 5:
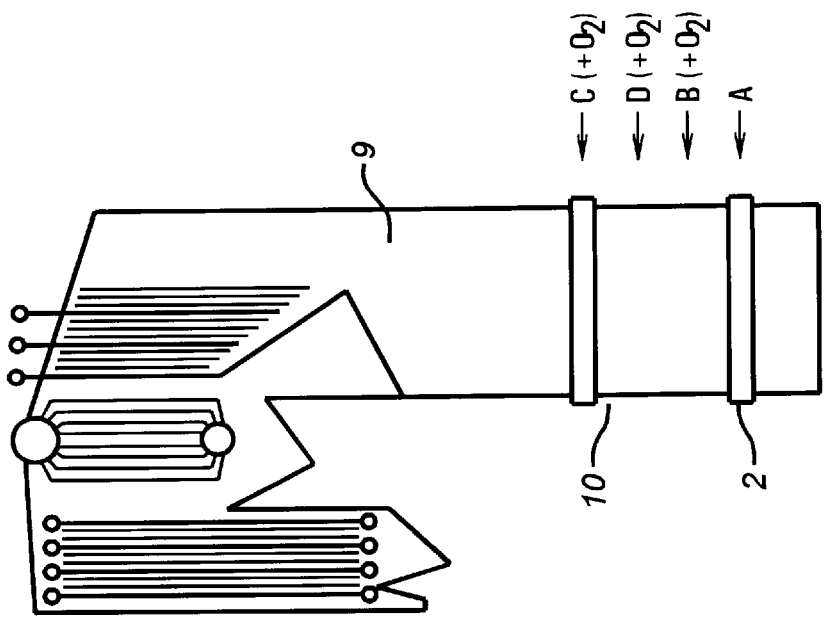
FIG. 5 illustrates a recovery boiler with a two level air system, illustrating a third level of oxidant injection installed below the original secondary air, and oxygen enrichment applied to at least the secondary air level and the new third level of air.

When the recovery boiler has a two level air system, such as the boiler of FIG. 5, a third level of oxidant injection is installed below the original secondary air, and oxygen enrichment is applied to at least the secondary air level and the new third level of air. In the boiler of FIG. 5, primary air (2) is injected at level (A), and the original secondary air (10) is injected at level (C), above the liquor guns level (D). In newer designs, injection of primary air (2) at level (A) is split in two sublevels: "primary" and "high primary".

A preferred location for the new third level of air injection is at the same level (D) as black liquor injector ports. New oxygen enriched air nozzles are installed in order to supply the oxygen enriched air flow to the newly installed air level. To be consistent with the description of the three level air boiler, the newly installed level (B) becomes the secondary level, and the original secondary level (C) becomes the tertiary level. Oxygen enriched air, with an oxygen concentration less than 30% (preferably comprised between 22% and 26%) is injected through new oxidant nozzles installed in the secondary and tertiary air levels, at a velocity greater than 100 ft/s, preferably greater than 200 ft/s for the secondary oxidant stream, and greater than 250 ft/s for the tertiary air stream.

The previous configuration requires minimal changes to the boiler waterwalls (9). However, a more preferred location for the additional third oxygen enriched air ports is at a level (B) located between the primary air ports level (A) and the liquor guns level (D) in new openings that must be installed. Level (B) then becomes the secondary oxidant injection level, and level (C) of the original secondary air level becomes the tertiary oxidant injection level. High velocity oxidant nozzles are installed so that oxygen enriched air, with an oxygen concentration less than 30% (preferably comprised between 22% and 26%) is injected through new oxidant nozzles installed in the secondary and tertiary air levels, at a velocity greater than 100 ft/s, preferably greater than 200 ft/s for the secondary oxidant stream, and greater than 250 ft/s for the tertiary air stream.

Heat Profile Control in Recovery Boiler

Controlling the heat profile of the recovery boiler with the oxygen enrichment level in at least one level of the combustion air system located at or above the secondary air level can help optimize the heat efficiency and reduce the emission of pollutants. Techniques to control the oxygen injection have been disclosed above. Here, it is proposed to measure in-situ the average temperature along a line of sight using an optical technique at different heights in the recovery boiler in order to establish the temperature profile in the boiler. The temperature profile is set at a desired level based on the knowledge of the boiler operation, and the oxygen injection is used to match the temperature profile measured in the boiler with the optical sensors with the desired temperature profile. By this technique, the optimal temperature profile can be maintained when the boiler load is changed, the black liquor composition varies, or other boiler upset conditions occur. Preferred optical techniques for the temperature measurement are based on the absorption and/or emission of sodium bearing species, such as, but not limited to: sodium atom Na, sodium sulfate $Na_2SO_4$, and sodium sulfide $Na_2S$.

Although the above examples and description are meant to be illustrative of the inventive adhesive and articles, they are not meant to unduly limit the scope of the following claims.

What is claimed is:

1. A method to increase throughput of a recovery boiler equipped with at least primary and secondary levels of injected combustion air, the method comprising operating the boiler with oxygen enrichment of at least one of said levels of injected combustion air, said oxygen enrichment being only in said secondary level of injected combustion air if the recovery boiler has only primary and secondary levels of injected combustion air, said oxygen enrichment being in one or more levels of injected combustion air selected from the group consisting of secondary, tertiary and quaternary levels for recovery boilers having more than primary and secondary levels of injected combustion air.

2. Method in accordance with claim 1 wherein the recovery boiler has only primary and secondary levels of injected combustion air.

3. Method in accordance with claim 2 wherein the recovery boiler has one oxygen concentration in the secondary level of injected combustion air, and a different oxygen concentration in the tertiary level of injected combustion air.

4. Method in accordance with claim 1 wherein the recovery boiler has primary, secondary, and tertiary levels of injected combustion air.

5. Method in accordance with claim 4 wherein the recovery boiler has the same oxygen concentration in the secondary and tertiary levels of injected combustion air.

6. Method in accordance with claim 4 wherein the oxygen concentration is up to 30% in the secondary and tertiary levels of injected combustion air.

7. Method in accordance with claim 4 wherein the recovery boiler has primary, secondary, and tertiary levels of injected combustion air, with oxygen enrichment in at least one of said secondary and tertiary levels of injected combustion air, and further oxygen injection at a liquor gun level.

8. Method in accordance with claim 1 wherein the oxygen concentration is up to 30% in at least the secondary level of injected combustion air.

* * * * *